J. W. PEPLINSKI.
AUTOMATIC TIRE UPSETTING AND WIRE TWISTING MACHINE.
APPLICATION FILED AUG. 7, 1908.
930,987.
Patented Aug. 10, 1909.
2 SHEETS—SHEET 1.
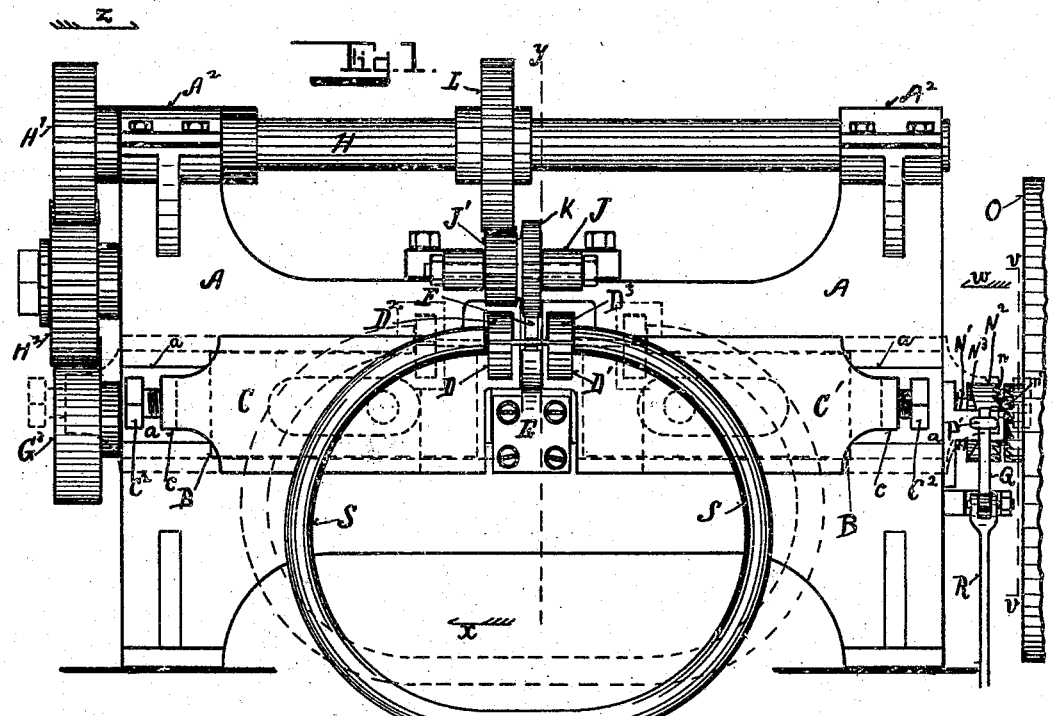
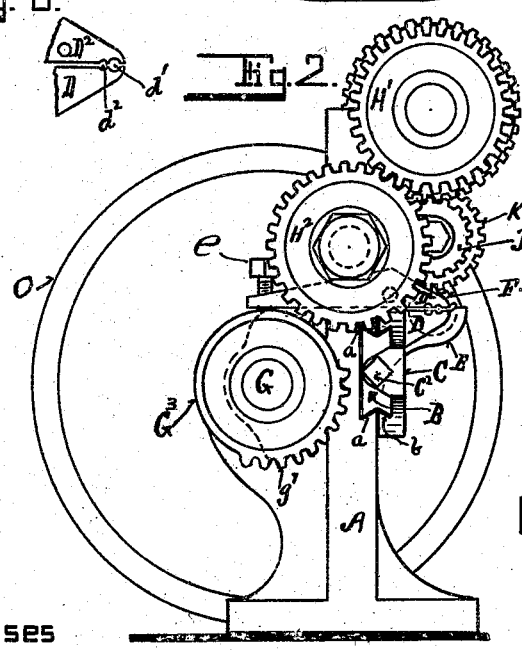
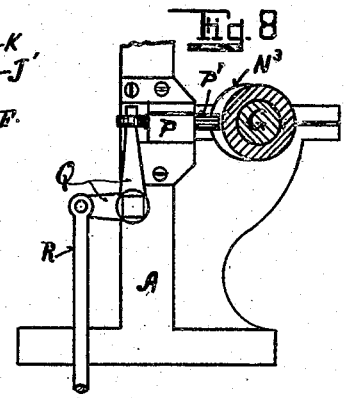
Witnesses
Florence Stockert
G. J. Mead
Inventor:
Julius W. Peplinski
By J. C. Armstrong
attorney

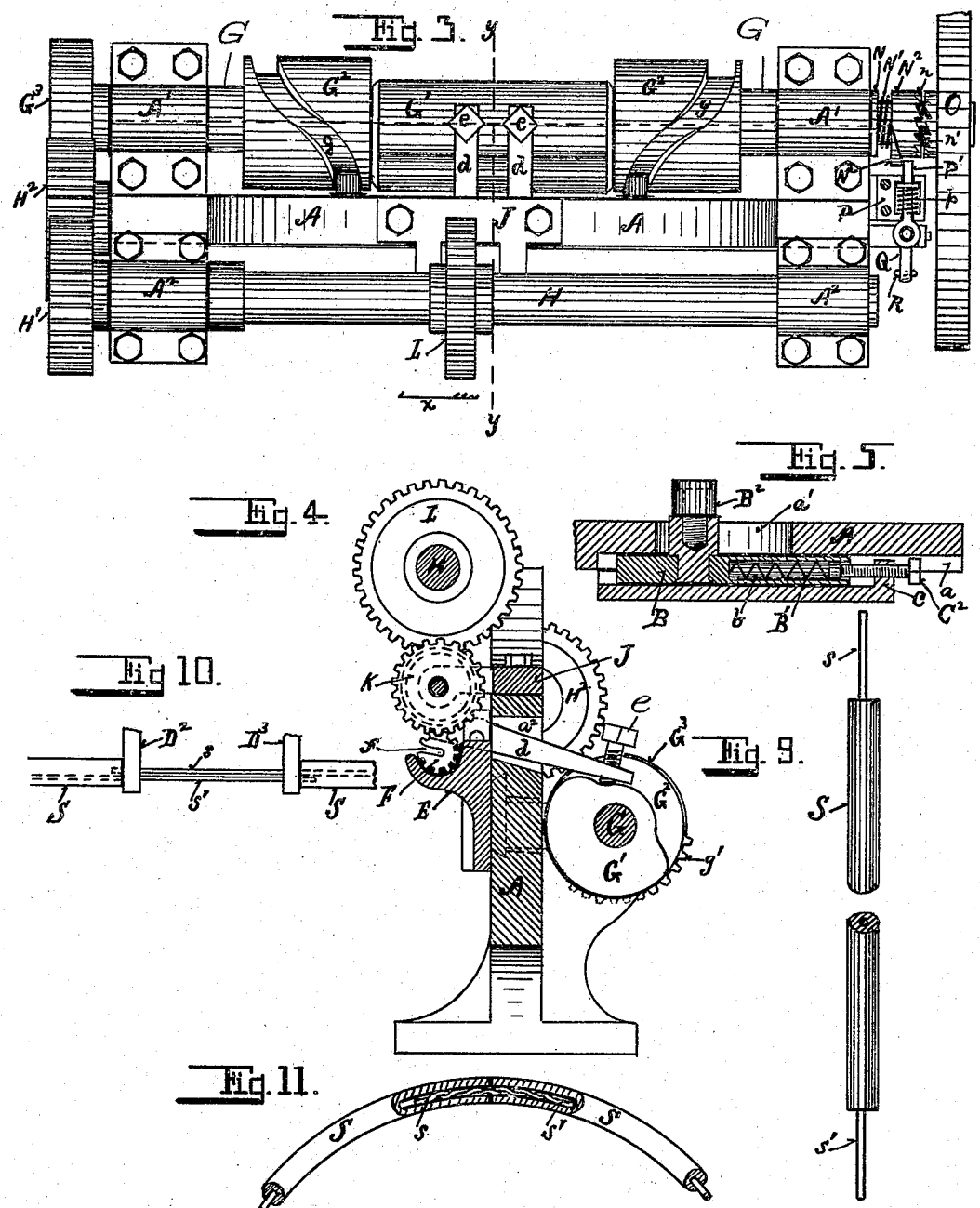

UNITED STATES PATENT OFFICE.

JULIUS W. PEPLINSKI, OF ERIE, PENNSYLVANIA, ASSIGNOR TO H. N. THAYER COMPANY, OF ERIE, PENNSYLVANIA, A CORPORATION OF PENNSYLVANIA.

AUTOMATIC TIRE-UPSETTING AND WIRE-TWISTING MACHINE.

No. 930,987.      Specification of Letters Patent.      Patented Aug. 10, 1909.

Application filed August 7, 1908. Serial No. 447,417.

*To all whom it may concern:*

Be it known that I, JULIUS W. PEPLINSKI, a citizen of the United States, residing at Erie, in the county of Erie and State of Pennsylvania, have invented certain new and useful Improvements in Automatic Tire-Upsetting and Wire-Twisting Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to automatic tire upsetting and wire twisting machines.

In the construction of baby carriage wheels and other like vehicle wheels upon which resilient tires are used, the resilient tire is usually what is known as a cushion tire, with a wire extending throughout the entire length thereof. This resilient material is constructed in a continuous straight cord with a longitudinal hole therethrough, and is cut into the required lengths, and wires inserted therethrough of a length sufficient to extend beyond the ends of the resilient tire material approximately one and one half inches at each end. The ends of this tire are then brought together, the resilient material then pushed backward upon the wire when the ends of the wire are twisted together. As it is difficult to push back or upset the resilient material upon the wire sufficiently so that when released it will close completely over the splice in the wire, I have conceived the present invention and constructed a machine embodying the same in tangible form, which machine is designed to automatically grip the ends of the wire, push back or upset the resilient tire material on the wire, twist the wire and release its grip upon the wire to permit the resilient tire material to move back over the splice in the wire.

The features of my invention are hereinafter more fully set forth and described, and illustrated in the accompanying drawings, in which:

Figure 1 is a front view in elevation of mechanism embodying my invention. Fig. 2 is an end view of the same looking in the direction of the arrow Z in Fig. 1. Fig. 3 is a top or plan view of the same. Fig. 4 is a vertical section of the same on the line $y$—$y$ in Figs. 1 and 3, looking in the direction of the arrow $x$. Fig. 5 is a longitudinal section of a fragment of the frame of my machine. Fig. 6 is a view in elevation of the left-hand side of one pair of wire gripping jaws looking in the direction of the arrow $z$ in Fig. 1. Fig. 7 is a right-hand view of the other pair of gripping jaws, looking in the direction of the arrow $x$ in Fig. 1. Fig. 8 is a view in elevation of a fragment of the drive-wheel end of my machine, looking in the direction of the arrow $w$ in Fig. 1, the drive-wheel being broken off on the line $v$—$v$ in Fig. 1. Fig. 9 is a view in elevation of a cushion tire used on a child's vehicle wheels. Fig. 10 shows the binding wire of a cushion tire gripped by the wire gripping jaws of my machine, and the resilient tire material thereon pushed, or upset backward, and the wire ready for the twisting operation. Fig. 11 shows a fragment of a tire illustrating the form of splice.

In these drawings A indicates the frame of the machine, which is adapted to stand on a table or other suitable support. Upon the front of this frame A, I make suitable slideways in which I place a slide B. In one end of this slide B, I make a recess $b$, in which I insert a spiral spring B' of suitable resistance. This slide B is provided with a stud B² which projects from the rear face thereof through an elongated opening $a'$ in the frame A. There being a slide B placed in ways $a$ on each side of the middle of the frame A as shown in Fig. 1. Upon these slides B in suitable ways $b$ thereon I place jaw bearing slides C C the outer ends of which are provided with inturned shoulders $c$ $c$, and through these shoulders $c$ $c$, I place regulating screws C² C² which are adapted to bear against the springs B' in the slides B, as shown in Fig. 5. It will be observed that the slides C C' are carried upon and by the slides B B, and that when the slides B B are moved apart from each other, any resistance to simultaneous movement of the slides C C' therewith tends to compress the spring B' (see Fig. 5) within the slides B, thereby forcing the slides C C to move from each other with a yielding pressure. Upon the inner ends of the slides C C, I secure stationary lower jaws D and D', and above these stationary jaws D and D' upon the slides C, I pivot the jaws D² and D³, the said jaws D² and D³ being provided with levers $d$ extending through a slotted opening $a^2$ in the frame A as shown in Figs. 3 and 4. The levers $d$ are provided with regulating screws $e$ by means of which the gripping force of the jaws D² and D³ can be regulated. The said jaws D and D² (Fig. 6) are provided with large transverse wire guiding grooves $d'$ adjacent to the outer ends thereof, and with small transverse wire gripping grooves $d^2$ back of said wire guiding grooves $d'$, and the jaws D′ and D³ (Fig. 7) are provided with small transverse wire gripping grooves $d^3$ adjacent to the front ends of said jaws, and with large transverse wire guiding grooves $d^4$ back of said grooves $d^3$.

Upon the frame A between the ends of the slides C C, and the jaws thereon, I secure a bracket E having a socket in the top thereof adapted to receive and support a slotted pinion F, so that the slot $f$ therein will be of the same elevation as the opening between the jaws D D′ and D² D³.

For operating the foregoing described mechanism I provide the frame A with journal boxes A′ A′ and A² A². In the boxes A′, I mount a main or drive shaft G. Upon this shaft G, I secure a cam G′ adapted to intermittently operate the jaw levers $d$ simultaneously, as hereinafter described. This cam G′ is somewhat elongated in order that the levers $d$ may slide spirally thereon. I also place on the shaft G at each end of the cam G′ a cam wheel G² having a cam-groove $g$ cut in the cylindrical face thereof adapted to receive the stud B², and to operate the slides B B and C C as hereinafter described. On one end of the shaft G, I secure a wheel G³ having on its periphery a segment of gear teeth $g'$.

In the boxes A², I mount a shaft H, having on one end thereof a gear wheel H′, and on the frame A, I pivot a gear wheel H², which intermeshes with the gear H′ on the shaft H, and with the segment of gear-teeth on the wheel G³. Upon the frame A, I secure a bracket J, and upon the bracket J, I mount a spur gear J′ having secured to its side and concentric therewith another spur gear K of slightly greater diameter. To drive these gears J and K, I place upon the shaft H a spur-gear L which intermeshes with the spur-gear J′, and within the socket in the bracket E, I place a slotted pinion F, which intermeshes with the spur-gear K. Upon the shaft G, outside of the box A′, I place a collar N; against the collar N, I place a spring N′, and against the spiral spring N′, I place a clutch sleeve N², which is secured against rotation on the shaft G by means of the ordinary spline and groove (not shown). This sleeve is provided with the usual clutch teeth or notches $n$ adapted to be engaged by like teeth or notches $n'$ on the hub of the drive-wheel O. The clutch sleeve is also provided with a cam-shoulder N³ adapted to be engaged to open the clutch and stop the machine. Upon the frame A, I secure a bracket P, in which I place a slide-bolt or latch P′ which is held in a forward position, as shown in Fig. 1, by means of the spring $p$, so as to engage the cam-shoulder N³, and force the teeth on the sleeve N² out of engagement with the teeth on the hub of the drive-wheel O. For operating the slide or latch P′, I provide a bell-crank-lever Q, which is pivoted upon the frame of the machine, with one arm in engagement with said bolt P′ preferably by being inserted into a ring in the end of said bolt P′. The other arm of the bell-crank-lever Q is connected with a foot lever (not shown) by means of a link R.

In operation a resilient tire S (see Fig. 9) of the required length is placed upon a wire of sufficient length that the ends $s$ and $s'$ extend somewhat beyond the ends of the tire. The two ends $s$ and $s'$ of the wire are then placed within the jaws D, D′ and D² D³, so that the end $s$ will extend through the groove $d^4$ in the jaws D′ D³ and be gripped in the groove $d^2$ in the jaws D D′, and the ends $s'$ of the wire will extend through the grooves $d'$ in the jaws D D² and be gripped by the groove $d^3$ in the jaws D′ D³, with the ends of the resilient tire abutting against the outside of said jaws as shown in Figs. 1 and 10. When in this position the ends of the wire pass through the slot $f$ in the slotted pinion F, as shown in Fig. 1. The operator then presses a foot lever (not shown) which causes the bolt P′ to be withdrawn to release the chuck sleeve N² and allow the spring N′ to force the same into engagement with the teeth upon the hub of the drive-wheel, which causes the cam G to rotate and raise the levers of the jaws D² and D³ and cause said jaws to firmly grip the tip ends $s$ and $s'$ of the wire. The cams G² then cause the slides C C to move horizontally in their ways carrying with them the said jaws, the pair of jaws D′ D³ drawing the end $s'$ of the wir through the jaws D D², and the jaws D D² drawing the end $s$ through the jaws D′ D³ to the position shown in Fig. 10. When the slides and jaws have reached their farthermost traverse the cam-grooves $g$ in the cam-wheels G² will hold them stationary in that position while the segment of gear $g'$ on the wheel G³ engages and intermeshes with the spur-wheel H² which causes the wheels H² and H′ and shaft H and spur-wheel L to rotate, which in turn through the spur-gears J′ K, will rotate the slotted pinion F a sufficient number of turns to firmly twist together the ends of the wire, embraced by the slot therein, and held by the jaws D D² and D′ D³. It will be noticed that this twisting of the wire together tends to draw the said two pairs of jaws toward each other. It is here that the double slides B C and the springs B′ within the slide B operate, by allowing enough yield to the slides C C to compensate for the shortening of said wire due to the twisting thereof. When the pinion F has been rotated a sufficient number of turns to firmly twist the ends $s$ and $s'$ of the wire together, the segment of gear $g'$ will have passed out of engagement with the teeth on the wheel $H^2$, thereby permitting the slotted pinion to stop revolving with its slot in the position it was in before it was revolved. The cam $G'$ then releases the jaws $D^2$ and $D^3$ which permits the resilient tire to move back over the splice as shown in Fig. 11, when the cam grooves $g$ in the cam-wheels $G^2$ causes the jaws to be returned to their inmost position, when the cam-shoulder $N^3$ on the clutch-sleeve $N^2$ contacts with the bolt $P'$ and causes the clutch to become disengaged and the machine to come to a rest, at the end of one revolution of the main shaft G, ready for another operation.

Having described the construction and operation of my machine so as to enable others to construct and use the same, I do not desire to limit myself to the exact construction of mechanism shown and described herein, as it is obvious that any one skilled in the art to which this invention appertains can readily embody the invention disclosed herein in other forms of mechanism. Therefore

What I claim as new and desire to secure by Letters-Patent is:

1. The combination of two pairs of jaws, means for closing and opening said pairs of jaws, means for moving said pairs of jaws apart and toward each other, means between said pairs of jaws for twisting together wires held by said two pairs of jaws, and means for intermittently operating said twisting mechanism, substantially as set forth.

2. The combination of a frame, slides therein, a pair of jaws on each of said slides, a cam for opening and closing said jaws, cams for moving said slides away from and toward each other, a slotted gear wheel rotating in a socket in the frame between said pairs of jaws, means for operating said cams, and means for intermittently operating said slotted gear wheel, substantially as set forth.

3. The combination of two pairs of jaws, each having a transverse gripping groove adapted to clamp a wire, and another groove which will allow a wire to slip therethrough, means for closing said pairs of jaws upon two parallel wires so one wire will be gripped by one pair of jaws and the other wire by the other pair of jaws, means for moving said jaws away from each other when the jaws are closed and toward each other when the jaws are opened, a slotted twisting pinion mounted between said pairs of jaws, means for rotating said pinion when the pairs of jaws have been moved apart, means for intermittently opening and closing said pairs of jaws, and means for intermittently operating said twisting pinion, substantially as set forth.

4. The combination of a frame, slides thereon, two pairs of jaws, one pair mounted on each slide, each pair of said jaws having a transverse gripping groove adapted to clamp a wire, and another slot which will allow a wire to slide freely therethrough, cam mechanism for closing said pairs of jaws upon two parallel wires so one wire will be gripped by one pair of jaws while the other wire will slide freely through the larger groove in said jaws, and the other wire will be gripped by the other pair of jaws, the first named wire passing through the larger opening therein, means for moving said pairs of jaws apart when closed so as to move said wires longitudinally one in each direction parallel to each other, a slotted pinion between said pairs of jaws, mounted and rotatable in a socket on the frame, means for intermittently operating said slotted pinion to twist wires held between said jaws, and means for opening said jaws, substantially as set forth.

In testimony whereof I affix my signature, in presence of two witnesses.

JULIUS W. PEPLINSKI.

Witnesses:
H. M. STURGEON,
GEO. A. STURGEON.